(12) United States Patent
Miles et al.

(10) Patent No.: US 8,039,138 B2
(45) Date of Patent: *Oct. 18, 2011

(54) CHLORIDE-FREE, SODIUM ION-FREE, AND WATER-FREE THERMAL BATTERIES USING MOLTEN NITRATE ELECTROLYTES

(75) Inventors: Melvin H. Miles, Ridgecrest, CA (US); Adam A. Grumet, Silver Spring, MD (US); Kurt W. Solomon, Fredericksburg, VA (US)

(73) Assignee: Millennium Engineering and Integration Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/653,106

(22) Filed: Dec. 8, 2009

(65) Prior Publication Data

US 2010/0092851 A1 Apr. 15, 2010

Related U.S. Application Data

(63) Continuation-in-part of application No. 11/893,125, filed on Aug. 14, 2007, now Pat. No. 7,629,075.

(51) Int. Cl.
*H01M 6/20* (2006.01)
*H01M 6/36* (2006.01)

(52) U.S. Cl. ......................... 429/103; 429/112

(58) Field of Classification Search .................. 429/103, 429/110, 112

See application file for complete search history.

(56) References Cited

U.S. PATENT DOCUMENTS

| | | | |
|---|---|---|---|
| 3,503,814 A | 3/1970 | Helms, Jr. et al. | |
| 4,068,045 A | 1/1978 | Abrams | |
| 4,087,591 A | 5/1978 | Bowers et al. | |
| 4,190,704 A | 2/1980 | Miles et al. | |
| 4,260,667 A | 4/1981 | Miles et al. | |
| 4,416,958 A | 11/1983 | Miles et al. | |
| 4,432,818 A | 2/1984 | Givens | |
| 4,528,253 A | 7/1985 | McManis, III et al. | |
| 4,535,037 A | 8/1985 | McManis, III et al. | |
| 4,555,455 A | 11/1985 | Fletcher et al. | |
| 4,588,662 A | 5/1986 | McManis, III et al. | |

(Continued)

OTHER PUBLICATIONS

Guidotti, Normann, Reinhardt, and Odinek, Development of High-Temperature Batteries for Use in Geothermal and Oil/Gas Boreholes, SAND2003-2249C, 2003, Sandia National Laboratories, Albuquerque, NM.

(Continued)

*Primary Examiner* — Stephen J. Kalafut
(74) *Attorney, Agent, or Firm* — Whiteford, Taylor & Preston LLP; Jeffrey C. Maynard

(57) ABSTRACT

Thermal batteries using molten nitrate electrolytes offer significantly higher cell voltages and improvements in energy and power density. A problem concerning gas-evolution reactions is solved by eliminating chloride ions, sodium ions, and moisture contaminants. One step is to avoid any chlorine-containing substances in any battery component. The decomposition of such substances into chloride ions results in passivating-film breakdown and gas-producing reactions with the electrolyte. Sodium ions also react with the anode and lead to decreased stability. Thus, the use of sodium ions in components of the battery is avoided. The effect of water in the melt relates to both the reactivity and out-gassing problem. Water in the melt will react with, and breach the insoluble and protective oxide film and can produce hydrogen gas. A method to measure water in the nitrate electrolyte melt via cyclic voltammetry, as well as means of eliminate water from the melt is presented.

21 Claims, 3 Drawing Sheets

| Lithium | $Li_2O$ | Molten Nitrate | | | |
|---|---|---|---|---|---|
| | $Li^+$ | $Cl^-$ | | | |
| | | | $Li^+$ | | $NO_3^-$ |
| | $Li^+$ | $Cl^-$ | | | |
| Li Metal | | | $Li^+$ | | $NO_3^-$ |
| | $Li^+$ | $Cl^-$ | | | |
| | | | $Li^+$ | | $NO_3^-$ |
| | $Li^+$ | $Cl^-$ | | | |

U.S. PATENT DOCUMENTS

| | | | |
|---|---|---|---|
| 4,654,278 | A | 3/1987 | McManis, III et al. |
| 5,006,429 | A | 4/1991 | Pracchia et al. |
| H001449 | H | 6/1995 | Miles |
| H001544 | H | 6/1996 | Miles |
| 6,544,691 | B1 | 4/2003 | Guidotti |
| 6,955,867 | B1 * | 10/2005 | Otsuki et al. .................. 429/314 |
| 7,629,075 | B2 * | 12/2009 | Miles ............................ 429/112 |
| 2008/0299447 | A1 * | 12/2008 | Fujiwara ....................... 429/103 |

OTHER PUBLICATIONS

Eaglepicher, Thermal Battery Design, EaglePicher Technologies, LLC, Joplin, MO.

Michael W. Davidson, Electricity and Magnetism: Thermal Batteries, Molecular Expressions, http://micro.magnet.fsu.edu/electromag/electricity/batteries/thermal.html, Jan. 28, 2003, National High Magnetic Field Laboratory, Tallahassee, FL.

* cited by examiner

CHLORIDE-FREE, SODIUM ION-FREE, AND WATER-FREE THERMAL BATTERIES USING MOLTEN NITRATE ELECTROLYTES

CROSS-REFERENCE TO RELATED APPLICATIONS

This application is a continuation-in-part of U.S. patent application Ser. No. 11/893,125, now U.S. Pat. No. 7,629,075, filed with the U.S. Patent and Trademark Office on Aug. 14, 2007, the specification of which is incorporated herein by reference.

BACKGROUND OF THE INVENTION

1. Field of the Invention

The present invention pertains to thermally activated electrochemical cells, and more particularly relates to thermal battery cells and still more particularly to thermally activated battery cells including a novel electrolyte system that is free of chloride ions, sodium ions, and traces of water.

2. Background of the Prior Art

Thermal batteries are used in all types of military devices that require long shelf lives (up to 20 years), and rapid activation (less than one second), and high energy and power densities. Prime application examples are air-to-air missiles such as the Sidewinder missile. Modern technology is placing increasing heavy requirements for electrical power in many weapon applications, thus thermal batteries with higher cell voltages and higher energy and power densities are presently in demand. Because of its strictly military applications, thermal battery technology has evolved much slower than commercial battery technology. Thermal battery development began with the Germans in World War II where Ca/LiCl—KCl/CaCrO$_4$ (2.8 V, 35 Wh/Kg) systems were used in the V-I and V-II rockets. The next major advancement was in 1980 with the introduction of the following thermal battery system: Li—Fe/LiCl—KCl/FeS$_2$ (2.0 V, 55 Wh/Kg). Later variations included the use of Li—Si and Li—Al anodes and the all-lithium electrolyte of LiCl—LiBr—LiF. The Li—Fe anode consist of liquid lithium (mp=181° C.) immobilized by iron powder and is often referred to as the LAN anode (Liquid Anode).

Thermal batteries have mainly focused on the use of LiCl—KCl electrolytes and other halide variations ever since their inception over sixty years ago. The LiCl—KCl eutectic has a high melting point of 352° C., and actual thermal battery operations require temperatures greater than 450° C. These high operating temperatures necessitate large amounts of energetic pyrotechnics such as Fe+KClO$_4$, and the use of insulating materials to maintain the operating temperature over the required lifetime of the activated thermal battery as well as for the protection of nearby electronics from the heat evolved by the thermal battery. Furthermore, the use of LiCl—KCl and related halide electrolytes prevents the use of modern high-voltage metal oxide cathode materials such as V$_2$O$_5$, LiCoO$_2$, and LiMn$_2$O$_4$. The aggressive attack by chloride ions at high temperatures results in the rapid destructions of metal oxide based cathode materials.

Molten nitrate electrolytes offer many advantages over LiCl—KCl and other halide-based electrolytes. For example, the LiNO$_3$—KNO$_3$ eutectic melts at 124° C.—more than 200° C. lower than LiCl—KCl. Therefore less pyrotechnic material is needed to activate the molten nitrate thermal battery and less insulating material is needed to maintain the lower operating temperature of this thermal battery. There would also be much less heat radiation from the molten nitrate thermal battery into any nearby electronic components of the missile or other weapon devices.

The major advantage offered by molten nitrate electrolytes for thermal batteries is that they are compatible with high-voltage metal oxide based cathode materials such as V$_2$O$_5$, PbO$_2$, LiCoO$_2$, and LiMn$_2$O$_4$. In fact, the oxidizing nature of molten nitrates favors the formation of metal oxide materials. The use of metal oxide based cathode materials can yield cell voltages of over 3 volts or higher when used with lithium cathodes, whereas the present thermal batteries such as Li/LiCl—KCl/FeS$_2$ yield only 2.0 volts per cell. This increase in cell voltage alone to 3.0 volts offers more than a 50% increase in the energy density of the thermal battery. For example, a fifteen-cell stack that delivers 30 volts can be replaced by a ten-cell stack if each cell yields 3.0 volts instead of 2.0 volts. Thus, a significant decrease in the battery weight and space requirements can be realized. In addition, less insulation and less pyrotechnic materials are needed in the molten nitrate thermal battery. In addition, the much lower operating temperatures offer longer operating lifetimes for molten nitrate electrolyte-based thermal batteries.

The major problem that must be solved before molten nitrate based thermal batteries become practical is the minimization of unwanted gas-production reactions within the battery. The solution to this problem is the object of this invention. With this invention, a major increase in cell voltages, energy density, and power density is feasible for thermal batteries using molten nitrate electrolytes.

SUMMARY OF THE INVENTION

Thermal batteries using molten nitrate electrolytes offer significantly higher cell voltages and marked improvements in energy and power densities over present thermal batteries. However, a major problem is gas-evolution reactions involving the molten nitrate electrolytes. This gassing problem has blocked the advantages offered by thermal batteries using molten nitrates. The solution to the outgassing problem is to eliminate the chloride ions, sodium ions, and moisture contaminates. The most important step in reducing chloride contamination is the avoidance of potassium perchlorate (KClO$_4$) or any other chlorine-containing substances that can decompose to produce chloride ions in any thermal battery component. The Fe+KClO$_4$ pyrotechnic used to activate thermal batteries is a key example. The decomposition of such substances into chloride ions (Cl$^-$) results in passivating-film breakdown and gas-producing reactions with the molten nitrate electrolyte. These reactions largely involve the lithium-component of the anode used in thermal batteries such as Li—Fe (LAN), Li—Si, and Li—Al. The introduction of chloride ions into the nitrate melt via the pyrotechnic materials produces a rapid breakdown of the protective oxide film on lithium-based anodes and leads to gas-producing reactions. Sodium ions (Na$^+$) present in the melt would react with the lithium metal and lead to the decreased stability of the anode. This reaction sequence was suggested from known thermodynamic properties of lithium and sodium nitrate salts, and confirmed by electrochemical studies. Thus, the usage of sodium ions in components of the battery (e.g. a LiNO$_3$—NaNO$_3$ electrolyte melt) must be avoided. The effect of water in the melt relates to both the lithium reactivity and the out-gassing problem. Water in the LiNO$_3$—KNO$_3$ melt will readily react with, and breach the insoluble and protective Li$_2$O film on the lithium. Subsequently, the water will react directly with the lithium to produce hydrogen gas.

Therefore, minimizing the lithium reactivity and out-gassing in molten $LiNO_3$—$KNO_3$ will require eliminating water from this melt.

The present invention solves the above problems associated with nitrate salt electrolyte thermal batteries by eliminating major contributors to gas generation during battery activation; specifically, the elimination of chloride ions ($Cl^-$), sodium ions ($Na^+$), and traces of water from the cell components and as contaminants.

The thermal battery cell of this invention comprises a low melting point nitrate salt electrolyte, a lithium based anode, a cathode, and a pyrotechnic heat source. Each component is free of chlorine, sodium, and water moisture.

It is, therefore, an object of the present invention to enable a thermal battery that avoids the disadvantages of the prior art.

Another object of the invention is the use of nitrate salts as a lower melting electrolyte, which shortens a thermal battery cell's activation time and reduces the weight of heat sources and insulation.

A further object of the invention is to enable a thermal battery having higher per cell voltage.

A method to measure small amounts of water in the nitrate electrolyte melt via cyclic voltammetry, as well as means of virtually eliminating the water from the melt is presented.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof and in relation to the accompanying drawing, in which.

DESCRIPTION OF EXEMPLARY EMBODIMENTS

The invention summarized above and defined by the enumerated claims may be better understood by referring to the following description, which should be read in conjunction with the accompanying drawing. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

This invention is based on models that explain how chloride ions ($Cl^-$) and sodium ions ($Na^+$), as well as water moisture ($H_2O$) in the molten nitrate electrolyte can lead to gas-producing reactions involving the lithium-based anode. This model also explains the observation that these gas-producing reactions increase with time once the thermal battery is activated. Furthermore, this model predicts that these gas-producing reactions will increase with the increase in the current density of the thermal battery. This model also explains how these gas-producing reactions in molten nitrate electrolytes can be minimized to the point that they have very little effect on the performance of molten nitrate based thermal batteries. New thermal battery compositions dictated by this model eliminate the problem of gas-producing reactions in thermal batteries utilizing molten nitrate electrolytes.

Figure 1:
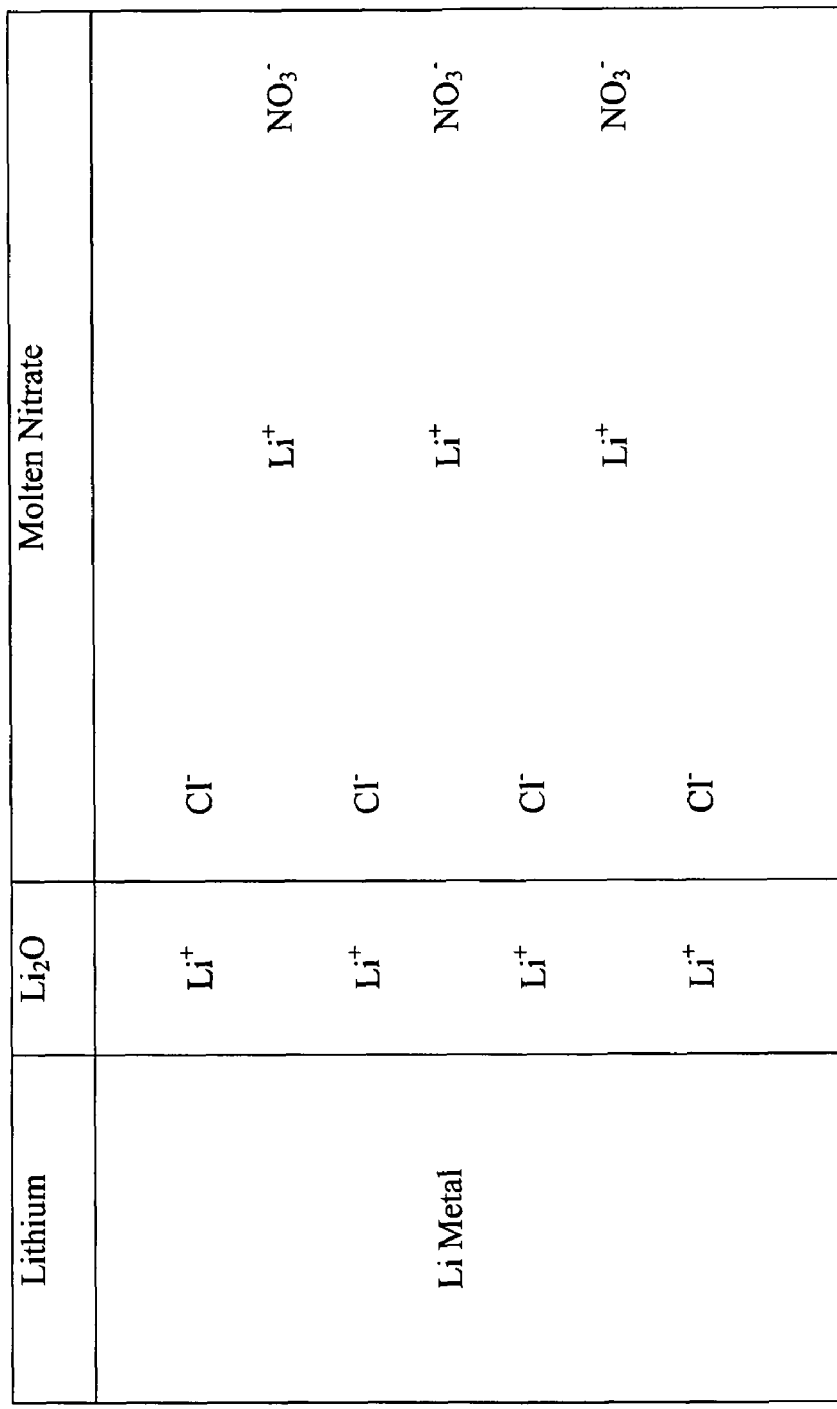
FIG. 1 shows a prior art model of lithium-based anode in a molten nitrate electrolyte that is contaminated with chloride ions.

The model on which the invention is based is shown schematically in FIG. 1 for a lithium-based anode in molten nitrate thermal battery systems. Lithium metal is the anode, $Li_2O$ is the protective film, and molten $LiNO_3$ is the electrolyte.

Considering the four basic natural forces: (1) Gravitational Force (2) Electromagnetic Force (3) Strong Nuclear Force and (4) Weak Nuclear Force, the Electromagnetic Force is the key for understanding this model. The lithium-based anode is protected by a lithium oxide ($Li_2O$) film that conducts lithium ions ($Li^+$). The excess lithium ions within the film give the film a net positive charge that attracts chloride ions ($Cl^-$) in the electrolyte to the film/electrolyte interface via the electromagnetic force. These aggressive chloride ions, in turn, attack the protective $Li_2O$ film to expose metallic lithium to the molten nitrate electrolyte. Other aggressive anions that can damage the passivating oxide film include $F^-$, $Br^-$, $I^-$, and $ClO_4^-$. In a preferred embodiment, the concentration of $F^-$, $Cl^-$, $Br^-$, $I^-$, and $ClO_4^-$ should be kept below about 0.01% wt. % contamination. The reaction of lithium metal with the molten nitrate is the gas-producing reaction represented by

  [1]

The breakdown of the protective $Li_2O$ film due to chloride ions or moisture ($H_2O$) can be represented by

  [2]

  [3]

Several important experimental observations can be readily explained by the model shown in FIG. 1.

1. A high concentration of lithium ions is essential for the nitrate melt. This renders the $Li_2O$ insoluble for the formation of the protective film. Nitrate melts that do not contain $LiNO_3$ as a major component, such as $NaNO_3$—$KNO_3$ melts (setting aside the issues of sodium in the nitrate melt, which will be discussed further), cannot be used for lithium-based anodes. Greater stability of the protective $Li_2O$ film can be attained by increasing the $LiNO_3$ component of the molten salt and minimizing traces of $H_2O$ in the melt.
2. The rate of the gas-producing reaction (Equation 1) will increase with time once the thermal battery is activated. This occurs because the amount of lithium ions within the protective film is increasing with time. The growing positive charge within the film attracts increasing amounts of chloride ions to the film/electrolyte interface. This, in turn, leads to an increasing rate of breakdown of the passivating film via Equation 2 and an increasing rate of gas production via Equation 1. Polar water molecules will also be attracted electrostatically to the $Li_2O$ film where they will react (Equation 3).
3. The rate of the gas-producing reaction (Equation 1) will increase with the current density. This is because a higher current density requires a higher rate of lithium ion transfer across the passivating film. Therefore, there is a greater positive charge within the protective film, hence greater chloride ion and $H_2O$ attraction to the film/electrolyte interface via the electromagnetic force. Again, greater chloride ion concentrations yield greater film breakdown and greater gas evolution via Equation 1.

Most thermal batteries use heat pellets consisting of iron powder and potassium perchlorate (Fe+KClO$_4$) as the pyrotechnic heat source for activating the thermal battery. For example, 80% by weight of iron powder mixed with KClO$_4$ yields 1420 J/g. This is close to the theoretical value of 1600 J/g assuming the heat pellet reaction is $$8Fe+3KClO_4 \rightarrow 4Fe_2O_3+3KCl \qquad [4]$$

The intense heat of this heat pellet reaction produces hot KCl fumes via sublimation that penetrate into every component of the thermal battery. This is not a problem for the conventional Li/LiCl—KCl/FeS$_2$ thermal battery that already contains KCl as a component of the melt, but it is disastrous for thermal batteries utilizing molten nitrate electrolytes. This smoke of hot KCl is readily absorbed by the LiNO$_3$—KNO$_3$ electrolyte. The result is considerable contamination of the molten nitrate electrolyte with chloride ions as depicted in FIG. 1. These chloride ions cause the breakdown of the protective Li$_2$O film leading to the direct reaction of the lithium-based anode with the molten nitrate to produce brown NO$_2$ gas as represented by Equation 1.

Several experimental studies of added KCl to the melt generally confirm that added Cl$^-$ ions increase the reactivity of lithium in molten nitrates and contribute to the out-gassing problem. The addition of 10 mole % KCl to LiNO$_3$—KNO$_3$ at 270° C. increased the reactivity of deposited lithium metal by a factor of 7.8 for a cobalt electrode and by a factor of 3.7 for an aluminum electrode. This reactivity increase was statistically significant at the 5σ level in both these studies.

The simplest solution to the gassing problem produced by chloride ions is to use a pyrotechnic heat source that cannot produce chloride or other halide anions. Heat paper consisting of Zr+BaCrO$_4$ has already found use in thermal batteries. Assuming the reaction $$Zr+2BaCrO_4 \rightarrow ZrO_2+2BaO+2CrO_2 \qquad [5]$$

This reaction can theoretically produce 856 J/g. Note that the reaction products are all harmless oxides that are compatible with molten nitrate electrolytes. Another possibility is the use of iron powder directly with LiNO$_3$ or KNO$_3$. Assuming the reaction $$2Fe+3LiNO_3 \rightarrow Fe_2O_3+3LiNO_2 \qquad [6]$$

This material could theoretically produce 1080 J/g. Neither this reaction nor the previous reaction (Equation 5) produces any chloride ions that lead to breakdown of the protective Li$_2$O film on the lithium-based anode.

The best replacement for the present Fe+KClO$_4$ heat pellet is the use of Al+Fe$_2$O$_3$ energetic nanocomposites aerogels for thermal battery pyrotechnics. Recent work on this pyrotechnic system has been reported by Lawrence Livermore National Laboratory (LLNL). Assuming the reaction $$2Al+Fe_2O_3 \rightarrow Al_2O_3+2Fe \qquad [7]$$

This material could theoretically produce 3985 J/g.

The reaction products for equation 7 are harmless aluminum oxide (Al$_2$O$_3$) and iron (Fe). An especially attractive feature of this pyrotechnic reaction is that the iron produced can serve as an electronic conductor between cells (intercell electronic connector). Furthermore, this Al+Fe$_2$O$_3$ material yields significantly more heat per gram than any pyrotechnic material that is presently being used in thermal batteries. This will lead to further increases in energy density for thermal batteries using molten nitrate electrolytes.

Although the major chloride contamination obviously stems from the Fe+KClO$_4$ pyrotechnic material, the use of chloride-free nitrates would also be helpful. Only high-purity nitrate salts that are relatively free of chloride ions should be used in molten nitrate based thermal batteries. Similar to aqueous solutions, silver chloride is insoluble in molten nitrates. Therefore, one method of minimizing chloride ions in molten nitrates is the addition of small amounts of AgNO$_3$ to the melt. Any chloride ions would be rendered ineffective by the formation of insoluble silver chloride. The use of 0.1 to 0.01% by weight of AgNO$_3$ would be optimum for this purpose. The presence of Ag$_+$ or AgCl would also contribute to the cathode reaction via their reduction to silver metal. In fact, AgNO$_3$ offers a cell potential of more than 3.4 V with lithium anodes in molten nitrates. However, only small amounts of AgNO$_3$ can be used because of possible cell shorting by the formation of silver dendrites. These small amounts of AgNO$_3$ are added directly to the molten nitrate electrolyte during the electrolyte preparation.

Another method for minimizing the effect of chloride ions in molten nitrates is the addition of micro-sized metallic particles to the melt such as nickel, iron, or titanium. The oxide coating on these particles would attract the chloride ions via the electromagnetic force similar to the effect for lithium depicted in FIG. 1. These metallic particles acting as "magnets" for chloride ions would help to prevent their attack on the lithium-based anode. These metallic particles will also attract traces of water in the melt and help prevent H$_2$O reacting with Li$_2$O (Equation 3).

The amounts of nickel, iron, or titanium particles mixed directly with the molten nitrate electrolyte generally are 0.05% by weight. However, these amounts can range from 0.1 to 0.01% by weight. These oxide-coated particles have no effect on battery electrode reactions except for their attraction for chloride ions and water molecules.

The thermodynamic values at 500° K for the following nitrate reaction $$MNO_{3(l)} \rightarrow M_{(l)}+NO_{2(g)}+\tfrac{1}{2}O_{2(g)} \qquad [8]$$

are shown in Table I for various nitrates. The ΔE column in Table I represents the relative potentials where the metal ions are reduced. It is unlikely that the cations have much effect on the thermodynamics of the nitrate oxidation reaction. The interesting result is that sodium ions, thermodynamically, can be reduced at a less negative potential (by 0.141 V) at 500° K than lithium ions. Therefore, in LiNO$_3$—NaNO$_3$ melts, sodium metal could be deposited along with lithium in our experiments. This suggests that in a thermal battery containing a lithium anode and using a LiNO$_3$—NaNO$_3$ eutectic, the reaction of Na$^+$ ions with the lithium metal could occur yielding sodium metal or lithium-sodium alloys. Because sodium is more reactive than lithium, this would lead to decreased stability of the anode. Despite its excellent ionic conductivity, this thermodynamic evidence suggests that the LiNO$_3$—NaNO$_3$ eutectic melt should be avoided in thermal batteries using lithium anodes. Electrochemical kinetic studies confirmed this thermodynamic evidence. Furthermore, any contamination of the LiNO$_3$—KNO$_3$ melt with sodium ions must be avoided. In a preferred embodiment, the LiNO$_3$—KNO$_3$ melt should have purity greater than 99% and, more particularly, purity greater than 99.9%.

TABLE I

| MNO$_3$ | ΔH (kJ/mol) | ΔS (J/mol K) | E (V) | ΔE (V)[a] |
|---|---|---|---|---|
| LiNO$_3$ | 491.65 | 231.8 | −3.895 | 0.000 |
| NaNO$_3$ | 486.45 | 248.5 | −3.754 | 0.141 |
| KNO$_3$ | 515.33 | 249.4 | −4.049 | −0.154 |
| RbNO$_3$ | 521.10 | 258.5 | −4.061 | −0.166 |
| CsNO$_3$ | 524.07 | 243.3 | −4.171 | −0.276 |

[a] ΔE = E − E(LiNO$_3$)

Experiments in LiNO$_3$—NaNO$_3$ indicated a greater reactivity of the deposited metal suggesting sodium deposition occurs. Studies in NaNO$_3$—KNO$_3$ gave a significant increase in the reactivity of the deposited metal (probably Na). Experiments were repeated after the addition of 10 mol % LiNO$_3$ to the NaNO$_3$—KNO$_3$ melt. There was a large decrease in the reactivity with the Al electrode but no significant changes were observed for Pt, Co, Mo, and Cu electrodes.

Table II shows the lithium reactivity and initial discharge potentials on metal substrates in LiNO$_3$—KNO$_3$ at 500° K. Because of formation of the Li—Al compound, the experimental shift in potential by 0.378 V (Table II) favors lithium deposition rather than sodium deposition when LiNO$_3$ was added to the melt. Sodium deposition with its higher reactivity (90 times more reactive) occurred with the other electrodes.

TABLE II

| Metal | $k_R$ (mol s$^{-1}$ cm$^{-2}$) | $E^a$ (V at 2 mA) | ΔE (V) |
|---|---|---|---|
| Ni | 3.57 × 10$^{-8}$ | −3.170 | — |
| Nb | 3.52 × 10$^{-8}$ | −3.170 | — |
| Ta | 2.88 × 10$^{-8}$ | −3.159 | 0.011 |
| Ti | 3.85 × 10$^{-8}$ | −3.142 | 0.028 |
| Hf | 3.35 × 10$^{-8}$ | −3.134 | 0.036 |
| Ag | 1.45 × 10$^{-7}$ | −3.025 | 0.145 |
| Pt | 2.03 × 10$^{-7}$ | −2.886 | 0.284 |
| Al | 1.41 × 10$^{-8}$ | −2.792 | 0.378 |

In order to ensure sufficient minimization of gas generation, the sodium content for the nitrate salts used (LiNO$_3$, KNO$_3$) must be 0.005% by weight or less (0.015% mol % sodium or less). This represents typical purities available commercially for LiNO$_3$.

The effect of H$_2$O in the melt relates to both the lithium reactivity and the out-gassing problem. Water in the LiNO$_3$—KNO$_3$ melt will readily react with the insoluble and protective Li$_2$O film on the lithium to form soluble LiOH as follows:

$$Li_2O + H_2O \rightarrow 2LiOH \qquad [9]$$

At any breach in the protective Li$_2$O film, water can also react directly with the lithium to produce hydrogen gas, i.e.

$$2Li + 2H_2O \rightarrow 2LiOH + H_2 \qquad [10]$$

Figure 2:
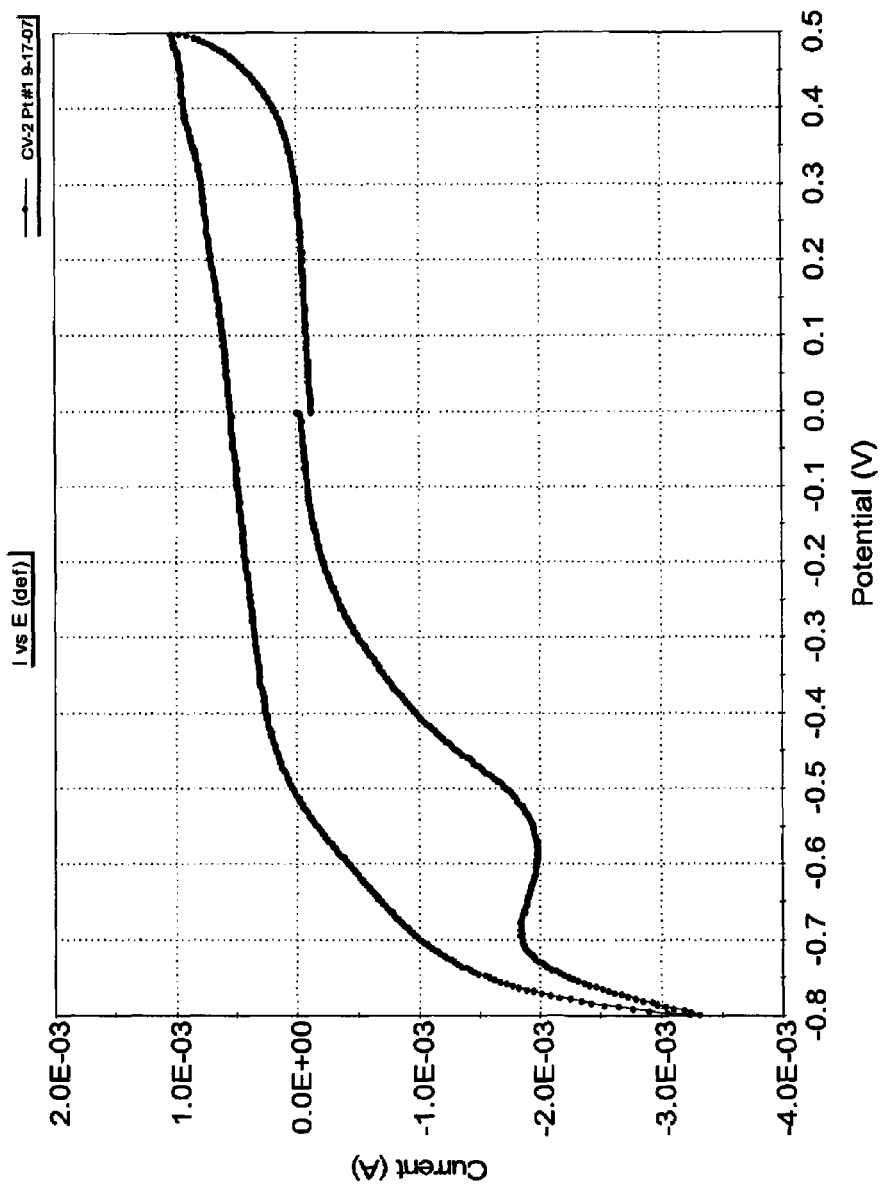
FIG. 2 is a graph illustrating water reduction in a $LiNO_3$—$KNO_3$ melt.

Therefore, minimizing the lithium reactivity and out-gassing in molten LiNO$_3$—KNO$_3$ will require eliminating water from this melt. A method to measure small amounts of water in the LiNO$_3$—KNO$_3$ melt is to determine the peak current (I$_p$) for the water reduction peak on platinum using cyclic voltammetry. FIG. 2 shows a water wave observed for Pt in LiNO$_3$—KNO$_3$ at 500° K. The potential scan rate was 50 mV/s and the peak current (I$_p$) was −1.987 mA at −0.5772 V. Using the absolute value for I$_p$, the water content for this melt is 0.0277 wt. %. Although the exact nature of the electrochemical reaction of water in molten nitrates is unknown, it likely involves the participation of water in the reduction of nitrate ions to nitrite.

$$H_2O + NO_3^- + 2e^- \rightarrow NO_2^- + 2OH^- \qquad [11]$$

This irreversible water-wave reaction is only observed on a few metal electrodes such as Pt, Ir, Ag, and Au.

Figure 3:
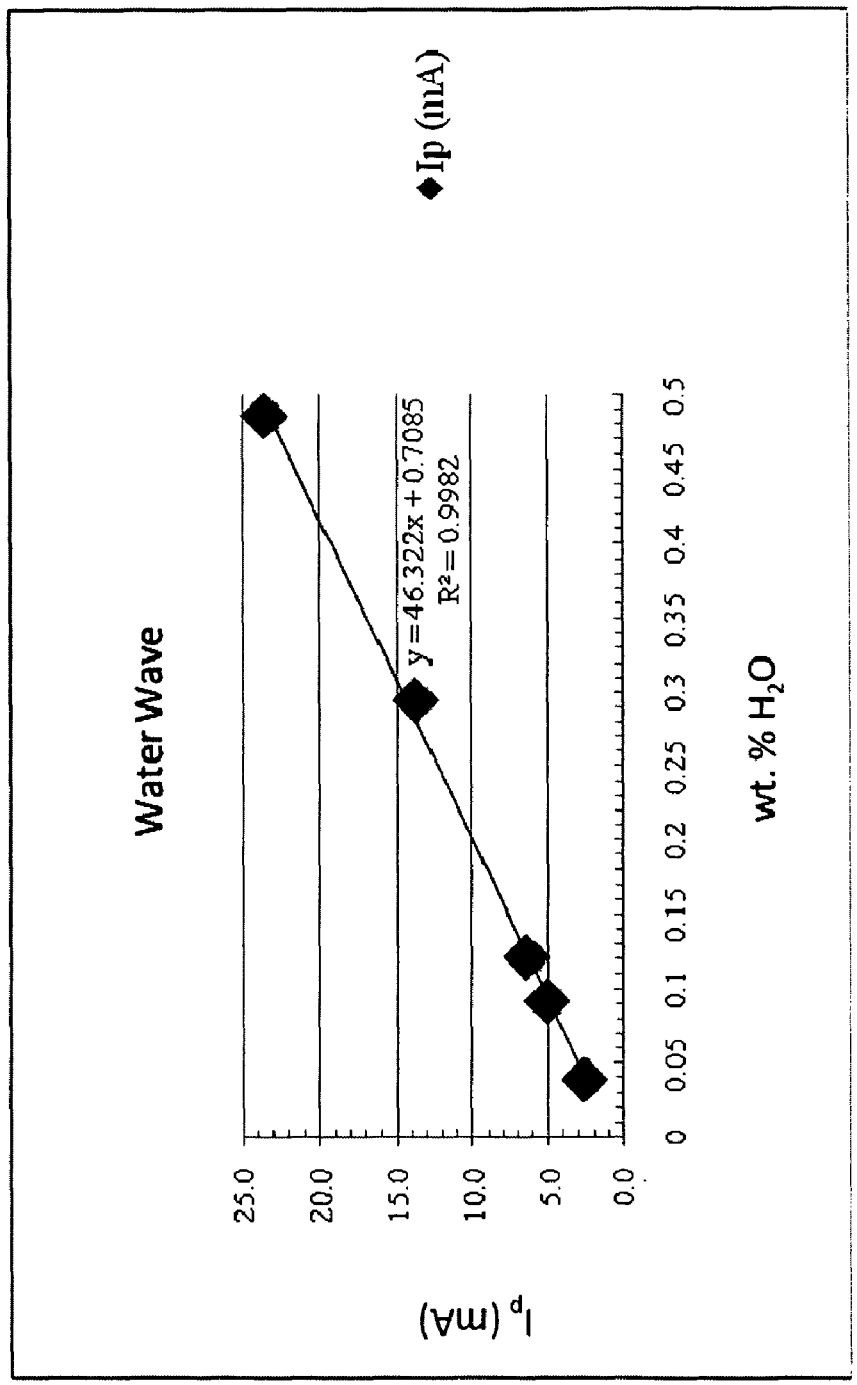
FIG. 3 is a graph of peak currents using a $LiNO_3$—$KNO_3$.melt.

Additions of known amounts of water in the form of Ca(NO$_3$)$_2$·4 H$_2$O were made to the LiNO$_3$—KNO$_3$ melt at 500° K (227° C.), and the peak current for the water wave was measured at a potential scan rate of 50 mV/s using a Pt electrode (A=0.30 cm$^2$). FIG. 3 shows Peak current (Ip) in mA versus the wt. % H$_2$O in the LiNO$_3$—KNO$_3$ melt at 500° K. These results are for a Pt electrode of 0.30 cm$^2$ area using a potential scan rate of 50 mV/s. The results presented in FIG. 3 illustrate the effect of H$_2$O on the peak current where absolute values in mA were used for the peak current. From the straight-line relationship, $$I_p = 46.32(\text{wt. \% H}_2\text{O}) + 0.708 \qquad [12]$$

the wt. % H$_2$O can be readily obtained from the measured peak current in mA. The use of any other Pt electrode will simply require an adjustment of I$_p$ based on the area of the Pt electrodes used.

The measurement of small amounts of water in the LiNO$_3$—KNO$_3$ melt allowed the investigation of the effect of water on the lithium reactivity. Not surprising, the lithium reactivity increases significantly as the water content of the melt increases. Table III shows the effect of water on lithium reactivity at 500° K for Al and Pt electrodes. The measured lithium reactivity in terms of the rate constant, k$_R$, is shown in Table III for several concentrations of water. There is nearly a linear increase with increasing water in the reactivity of lithium deposited onto the aluminum electrode. The lithium deposited onto platinum is always considerably more reactive, thus the effect of water on this reactivity (Table III) is smaller but still clearly measurable. The out-gassing problem in nitrate melts can be minimized by eliminating water from the melt as well as by eliminating chloride and sodium ions as discussed previously. It would be required that the water content in the nitrate melt be 0.050% weight or less.

TABLE III

| Wt. % H$_2$O | $k_R$ (Al) (mol s$^{-1}$ cm$^{-2}$) | $k_R$ (Pt) (mol s$^{-1}$ cm$^{-2}$) |
|---|---|---|
| 0.025 | 1.05 × 10$^{-8}$ | 2.18 × 10$^{-7}$ |
| 0.050 | 1.81 × 10$^{-8}$ | 2.47 × 10$^{-7}$ |
| 0.100 | 4.90 × 10$^{-8}$ | 4.19 × 10$^{-7}$ |
| 0.485 | 19.40 × 10$^{-8}$ | 7.30 × 10$^{-7}$ |

The sensitivity of the water wave measuring technique has revealed that drying the LiNO$_3$ and KNO$_3$ salts for 24 hours in a vacuum oven at 130° C. was not sufficient to remove the water. The value of I$_p$ indicated that 0.060% weight H$_2$O remained in the melt. However, a process of vigorously bubbling argon gas through the melt for 1 to 2 hours was effective in removing all measurable water from the melt. In addition to argon gas, other gases could be used such as helium, nitrogen or oxygen. More reactive gases such as chlorine should never be used. Oxygen gas also provides a means of converting any nitrites (NO$_2^-$) back to the desired nitrate (NO$_3^-$) ions.

Present thermal batteries based on LiCl–KCl or other halide electrolytes yield 2.0 volts per cell and, at best, about 55 W·h/Kg for energy density. Thermal batteries based on molten nitrates with lithium-based anodes and metal oxide cathodes can yield much higher cell voltages. For example, the Li/LiNO$_3$—KNO$_3$/LiMn$_2$O$_4$ cell yields 3 volts per cell. Molten nitrates provide a 4.5-volt electrochemical window between the reduction of lithium ions and the oxidation of the nitrate melt. For a cell voltage of 3.0 volts, energy densities of 85 Wh/kg would be expected for molten nitrate based thermal batteries. A cell voltage of 4.0 volts would yield energy densities of 110 Wh/kg. These are significant increases of 50 to 100% in energy density offered by molten nitrate electrolytes used in thermal batteries. Lower operating temperatures, less insulation, less pyrotechnic materials, and longer operational lifetimes are further significant advantages. These advantages have remained unrealized because of the gassing problem with thermal batteries using molten nitrate electrolytes. The elimination of this gassing problem is the subject of this invention. The elimination or at least the minimization of chloride contamination of the nitrate melt is one solution to this problem. The elimination of sodium ions and water from the melt are also very important for a solution to this problem.

The use of molten nitrate electrolytes opens the door to many new high voltage cathode materials that are being developed for lithium-ion batteries. These new cathode materials include $LiCoO_2$, $LiMn_2O_4$ and other materials that yield 4 volts per cell or higher with lithium anodes. Previous work with molten nitrates has shown that $AgNO_3$, $Ag_2CrO_4$, and other materials yield more than 3 volts per cell. Theoretical calculations show that $PbO_2$ yields 4 volts per cell. Although $PbO_2$ decomposes at 290° C., it may be stabilized by the oxidizing nature of molten nitrates. It should be noted thermodynamically that $\Delta S$ is negative for most cell reactions, thus $\Delta G$ becomes less negative at higher temperatures ($\Delta G=\Delta H-T\Delta S$) and open-circuit cell voltages ($E=-\Delta G/nF$) decrease as the temperature increases. Thus, a 4-volt cathode material at 25° C. may yield only 3.8 volts per cell at 250° C. Furthermore, actual cell voltages are influenced somewhat by the choice of electrolyte.

Lower thermal battery operating temperatures are another significant advantage of molten nitrate based thermal batteries. Present halide-based electrolytes such as LiCl—KCl melt at 352° C. or higher. Present thermal battery operating temperatures are 450-550° C. In contrast, the $LiNO_3$—$KNO_3$ eutectic melts at 124° C. and operating thermal battery temperatures are 150 to 350° C. Thus, thermal battery temperature is reduced by a significant 200° C.

High power densities are another important characteristic for thermal batteries. Power in watts is given by cell voltage times current in amps ($P=E\cdot I$), thus a higher cell voltage yields higher power as long as the cell reaction kinetics can maintain a high cell current. Although reaction kinetics will likely be somewhat slower at the lower temperatures of molten nitrates, significantly higher cell voltages will compensate for this. Thus, high power densities are expected for thermal batteries using molten nitrate electrolytes.

The breakdown of the passivating film on lithium-based anodes in molten nitrates is similar to many other corrosion processes except that the corrosion process is much faster because of both the higher temperatures created in the melt and the high chemical reactivity of lithium metal. The role of chloride ions in accelerating the corrosion of many different metals, especially iron and steel, is well documented. The corrosion processes of various metals involve a metal/passivating oxide film interface and an oxide film/environmental interface. An electrical double layer is established at each interface with the metal boundary negative charged and the oxide film positively charged. This creates an attraction for negative ions, such as chloride ion, at the oxide film/environmental interface. A moist coastal environment rich in chloride ions promotes corrosion while a dry desert environment greatly slows corrosion processes, thus water also contributes to corrosion. Similarly, cold climates that use chloride salts for de-icing roads result in increased corrosion rates. Moisture is essential for many corrosion processes in providing mobility for dissolved chloride salts to reach the oxide film/environmental interface and to initiate corrosion processes.

This invention will apply directly to all thermal batteries that use Li—Fe, Li—Si, Li—B, Li—Al, or other lithium alloys or composites as the anode and molten nitrates such as $LiNO_3$—$KNO_3$ as the electrolyte. Furthermore, the molten nitrate electrolyte can use Li—Ca or Li—Mg alloys as anode materials. The pyrotechnic component of such thermal batteries cannot contain potassium perchlorate ($KClO_4$) or any other substance containing the element chlorine that can decompose into chloride ions. Various metal oxide based cathode materials can be used with the molten nitrate electrolyte, such as $LiMn_2O_4$. Other high-voltage metal oxide based cathode materials such as $V_2O_5$, $PbO_2$, $LiCoO_2$, $MnO_2$ and $LiV_3O_8$ may be used. In some embodiments, insoluble silver compounds such as $Ag_3PO_4$ or $Ag_2CrO_4$ can be used as a cathode material. Additionally, other common metal oxide cathode materials such as AgO and $Ag_2O$ may be used. According to the present invention, many other metal oxides could be used as cathode materials, especially complex metal oxides used in lithium-ion batteries. Such metal oxides, however, must be thermally stable over the thermal battery operating temperature.

The molten nitrate must contain sufficient lithium nitrate ($LiNO_3$) to provide stability to the $Li_2O$ protective film on the lithium-based anode. Therefore, one attractive composition for the thermal battery is the following:

Li—Fe/$LiNO_3$—$KNO_3$/$LiMn_2O_4$    [13]

This composition yields about 3.0 V per cell. The $LiNO_3$—$KNO_3$ electrolyte itself must also be free of chloride ion contamination as well as any possible chloride ion contamination produced by the pyrotechnic material. Therefore, Fe+$KClO_4$ cannot be used as the pyrotechnic material. The pyrotechnic material to be used instead for the thermal batteries containing molten nitrate electrolytes is Al+$Fe_2O_3$ energetic nanocomposites aerogels or any other pyrotechnic materials that do not contain the element chlorine (Cl). This selection of the pyrotechnic material eliminates the problems of gas-producing reactions in thermal batteries employing molten nitrate electrolytes. Additives to the electrolyte such as $AgNO_3$ or micro-sized metallic particles such as nickel, iron, or titanium neutralize the effects of small contaminations of chloride ions and water present in the nitrate salts themselves.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:
1. A thermal battery comprising:
a cathode;
an anode;
a barrier free pyrotechnic heat source; and
a molten nitrate electrolyte, wherein
contamination of the nitrate electrolyte by chloride ions, sodium ions, and water is minimized, and
the use of any chlorine containing material as a pyrotechnic component is avoided.

2. The thermal battery according to claim 1, said nitrate electrolyte comprising a eutectic mixture of $LiNO_3$—$KNO_3$.

3. The thermal battery according to claim 2, said mixture of $LiNO_3$—$KNO_3$ having a purity greater than 99%.

4. The thermal battery according to claim 1, said nitrate electrolyte comprising 0.01% -0.1% by weight of $AgNO_3$.

5. The thermal battery according to claim 1, said nitrate electrolyte further comprising micro-sized particles of transition metals selected from the group consisting of: Ni, Fe, and Ti.

6. The thermal battery according to claim 1 comprising a eutectic mixture of $LiNO_3$—$KNO_3$ and wherein said anode comprises a lithium-based material.

7. The thermal battery according to claim 6 wherein said anode material is selected from the group consisting of:
Li—Fe;
Li—Si;
Li—B, and
Li—Al.

8. The thermal battery according to claim 1 wherein said electrolyte contains less than about 0.01% by weight of chloride ion contamination.

9. The thermal battery according to claim 1 wherein anions selected from the group consisting of $F^-$, $Cl^-$, $Br^-$, $I^-$, and $ClO_4^-$ are kept below about 0.01 weight % contamination.

10. The thermal battery according to claim 1 wherein said anode comprises a lithium-based material, said electrolyte comprises a nitrate salt, and said cathode comprises a metal oxide material or an insoluble silver compound.

11. The thermal battery according to claim 10 wherein said cathode material is selected from the group consisting of:
$LiCoO_2$;
$LiMn_2O_4$;
$V_2O_5$;
$PbO_2$;
$MnO_2$;
AgO;
$Ag_2O$;
$LiV_3O_8$;
$Ag_3PO_4$; and
$Ag_2CrO_4$.

12. The thermal battery according to claim 1 wherein said barrier free pyrotechnic is selected from the group consisting of:
$Zr+BaCrO_4$;
$Fe+LiNO_3$;
$Fe+KNO_3$, and
$Al+Fe_2O_3$.

13. The thermal battery according to claim 1 wherein said molten nitrate electrolyte is selected such that it eliminates or minimizes any gas-producing reactions.

14. The thermal battery according to claim 1 wherein said thermal battery can readily operate at internal temperatures approximately 200° C. lower than present thermal batteries that utilize chloride salt electrolytes.

15. The thermal battery according to claim 1 wherein said thermal battery can deliver 3 volts per cell or higher.

16. The thermal battery according to claim 1 wherein said thermal battery delivers an energy density of 85 Wh/kg or higher.

17. The thermal battery according to claim 1 having chloride and water contamination less than 0.05 weight % and sodium contamination less than 0.005 weight %.

18. The thermal battery according to claim 17 comprising $LiNO_3$—$KNO_3$ and which activates at 124° C. and operates between approximately 150 to 350° C.

19. The thermal battery according to claim 1 wherein said electrolyte does not include LiCl in the eutectic mix.

20. The thermal battery according to claim 1, said molten nitrate electrolyte comprising Li—Ca or Li—Mg alloys as anode materials.

21. The thermal battery according to claim 1 wherein water is reduced from the nitrate electrolyte melt by bubbling a gas selected from the group consisting of argon, helium, nitrogen and oxygen through the melt.

* * * * *